United States Patent
Muneda et al.

(10) Patent No.: US 11,655,932 B2
(45) Date of Patent: May 23, 2023

(54) OUTER PACKING MATERIAL FOR VACUUM INSULATION MATERIAL, VACUUM INSULATION MATERIAL, AND ARTICLE PROVIDED WITH VACUUM INSULATION MATERIAL

(71) Applicant: DAI NIPPON PRINTING CO., LTD., Tokyo-to (JP)

(72) Inventors: Taku Muneda, Tokyo-to (JP); Masahiro Imai, Tokyo-to (JP)

(73) Assignee: DAI NIPPON PRINTING CO., LTD., Tokyo (JP)

(*) Notice: Subject to any disclaimer, the term of this patent is extended or adjusted under 35 U.S.C. 154(b) by 229 days.

(21) Appl. No.: 16/978,225

(22) PCT Filed: Mar. 4, 2019

(86) PCT No.: PCT/JP2019/008375
§ 371 (c)(1),
(2) Date: Oct. 26, 2020

(87) PCT Pub. No.: WO2019/172180
PCT Pub. Date: Sep. 12, 2019

(65) Prior Publication Data
US 2021/0048136 A1    Feb. 18, 2021

(30) Foreign Application Priority Data
Mar. 5, 2018  (JP) .............................. JP2018-038462

(51) Int. Cl.
*F16L 59/065*  (2006.01)
*B32B 27/06*   (2006.01)
*F16L 59/02*   (2006.01)

(52) U.S. Cl.
CPC ............ *F16L 59/065* (2013.01); *B32B 27/06* (2013.01); *F16L 59/02* (2013.01); *B32B 2255/10* (2013.01);
(Continued)

(58) Field of Classification Search
None
See application file for complete search history.

(56) References Cited

U.S. PATENT DOCUMENTS 5,704,980 A * 1/1998 Misiano .................. C23C 14/20
                                                        118/712
2016/0211526 A1 * 7/2016 Toda ................. G01N 23/20091
2017/0297793 A1   10/2017 Matoba et al.

FOREIGN PATENT DOCUMENTS

JP    2003-262296 A    9/2003
JP    2006-070923 A    3/2006
(Continued)

OTHER PUBLICATIONS

Jamieson+Windle—struct. & barrier prop, metallized polymer films—J.Mat.Sci.—1983 (Year: 1983).*

(Continued)

*Primary Examiner* — John Vincent Lawler
(74) *Attorney, Agent, or Firm* — Oliff PLC

(57) ABSTRACT

An outer packing material for vacuum insulation material including a thermally weldable film and a gas barrier film; wherein the gas barrier film includes a base material and a metal aluminum film formed on one surface of the base material; and the metal aluminum film satisfies the below formula (1) and formula (2):

$$1.0*10^{-3} \le (I_A/I_B)/T \le 3.5*10^{-3} \quad (1)$$

$$(A/B)/T \ge 3.8*10^{-3} \quad (2).$$

3 Claims, 1 Drawing Sheet

(52) U.S. Cl.
CPC .............. *B32B 2255/205* (2013.01); *B32B 2307/304* (2013.01); *B32B 2307/7242* (2013.01)

(56) References Cited

FOREIGN PATENT DOCUMENTS

| | | | | | |
|---|---|---|---|---|---|
| JP | 2008/106532 | * | 5/2008 | .............. | B32B 7/02 |
| JP | 2013/007462 | * | 1/2013 | .............. | F16L 59/06 |
| JP | 2013-103343 A | | 5/2013 | | |
| JP | 2014-062562 A | | 4/2014 | | |
| JP | 2016-008706 A | | 1/2016 | | |
| JP | 2017-210986 A | | 11/2017 | | |
| KR | 10-2017-0048475 A | | 5/2017 | | |
| WO | WO 2016/006191 | * | 1/2016 | ............. | B32B 27/34 |

OTHER PUBLICATIONS

Kukla—modern vacuum web coating technology—Surf.Coat.Tech.—1996 (Year: 1996).*
Lange—barrier plastic tech—Packag Technol Sci—2003 (Year: 2003).*
Kojima—JP 2008-106532 A—MT—Rej.Rel.Appl.—vacuum heat insulation material—2008 (Year: 2008).*
Nagaswaw-JP 2013-007462 A - Isr D4- Mt -vacuum insulator w-gas barrier-2013 (Year: 2013).*
Nakanishi - WO 2016-006191 A1 - Isr D3 + Euro D2 - MT - laminate for vacuum packaging -2016 (Year: 2016).*
May 28, 2019 Search Report issued in International Patent Application No. PCT/JP2019/008375.

\* cited by examiner

OUTER PACKING MATERIAL FOR VACUUM INSULATION MATERIAL, VACUUM INSULATION MATERIAL, AND ARTICLE PROVIDED WITH VACUUM INSULATION MATERIAL

TECHNICAL FIELD

The present disclosure relates to an outer packing material for vacuum insulation material used for forming a vacuum insulation material.

BACKGROUND ART

In recent years, vacuum insulation materials have been used for the purpose of energy conservation of articles. A vacuum insulation material is a material in which a core is arranged inside the bag body of an outer packing material, and inside the bag body is kept in a vacuum state of which pressure is lower than the atmospheric pressure; thus, heat convection inside is suppressed to exhibit excellent thermal insulation performance. Incidentally, the outer packing material used for the vacuum insulation material is referred to as an outer packing material for vacuum insulation material, or simply an outer packing material while explained.

Outer packing materials for vacuum insulation material require properties such as gas barrier properties for preventing gas such as oxygen and water vapor from permeating, and thermal weldability for enclosing and sealing a core material by thermally welding to seal the periphery of a pair of facing outer packing materials to form a bag body, in order to keep the vacuum state inside the vacuum insulation material for a long period of time. In order to satisfy these properties, in the outer packing material for vacuum insulation material, a layered body including a gas barrier film and a thermally weldable film as constituting members is generally used (such as in Patent Documents 1 to 4).

As the gas barrier film, a constitution of a base material such as a plastic film including an inorganic thin film such as a metal film or a metal oxide film on its surface has been known. Among gas barrier films, a gas barrier film including a metal aluminum film is capable of providing high water vapor barrier properties with relatively low cost (Patent Document 1). The gas barrier film including the metal aluminum film may be obtained by, for example, forming a metal aluminum film on the surface of a base material by methods such as a vapor deposition method.

CITATION LIST

Patent Documents

Patent Document 1: Japanese Patent Application Laid-Open (JP-A) No. 2003-262296
Patent Document 2: JP-A No. 2013-103343
Patent Document 3: JP-A No. 2006-070923
Patent Document 4: JP-A No. 2014-062562

SUMMARY

Technical Problem

With the outer packing material for vacuum insulation material including the gas barrier film with the metal aluminum film as a constituent, sufficient water vapor barrier properties may not be achieved in some cases depending on the condition of the metal aluminum film.

A main object of the present disclosure is to provide an outer packing material for vacuum insulation material, a vacuum insulation material, and an article provided with vacuum insulation material, with those excellent initial water vapor barrier properties are achieved and degrade in water vapor barrier properties due to bend is inhibited.

Solution to Problem

The present disclosure provides an outer packing material for vacuum insulation material comprising a thermally weldable film and a gas barrier film; wherein the gas barrier film includes a base material and a metal aluminum film formed on one surface of the base material; and the metal aluminum film satisfies the below formula (1) and formula (2):

$$1.0*10^{-3} \leq (I_A/I_B)/T \leq 3.5*10^{-3} \tag{1}$$

$$(A/B)/T \geq 3.8*10^{-3} \tag{2}$$

In the formula (1) and the formula (2), $I_A$ represents a peak intensity (cps) of a diffraction peak positioned at $2\theta=38.5°\pm1.0°$ measured for the metal aluminum film in a X-ray diffraction measurement using a CuKα-ray; $I_B$ represents a peak intensity (cps) of a diffraction peak positioned at $2\theta=44.6°\pm1.0°$ measured for the metal aluminum foil in a X-ray diffraction measurement using a CuKα-ray; A represents a peak intensity (kcps) of an aluminum element in the metal aluminum film measured in a fluorescent X-ray analysis; B represents a peak intensity (kcps) of an aluminum element in a metal aluminum foil measured in a fluorescent X-ray analysis; and T represents a thickness (nm) of the metal aluminum film.

The present disclosure also provides a vacuum insulation material comprising a core material, and an outer packing material enclosing the core material; wherein the outer packing material includes a thermally weldable film and a gas barrier film; the gas barrier film includes a base material and a metal aluminum film formed on one surface of the base material; and the metal aluminum film satisfies the below formula (1) and formula (2):

$$1.0*10^{-3} \leq (I_A/I_B)/T \leq 3.5*10^{-3} \tag{1}$$

$$(A/B)/T \geq 3.8*10^{-3} \tag{2}$$

In the formula (1) and the formula (2), $I_A$ represents a peak intensity (cps) of a diffraction peak positioned at $2\theta=38.5°\pm1.0°$ measured for the metal aluminum film in a X-ray diffraction measurement using a CuKα-ray; $I_B$ represents a peak intensity (cps) of a diffraction peak positioned at $2\theta=44.6°\pm1.0°$ measured for the metal aluminum foil in a X-ray diffraction measurement using a CuKα-ray; A represents a peak intensity (kcps) of an aluminum element in the metal aluminum film measured in a fluorescent X-ray analysis; B represents a peak intensity (kcps) of an aluminum element in a metal aluminum foil measured in a fluorescent X-ray analysis; and T represents a thickness (nm) of the metal aluminum film.

The present disclosure also provides an article provided with vacuum insulation material comprising an article including a thermal insulation region, and a vacuum insulation material; wherein the vacuum insulation material includes a core material, and an outer packing material enclosing the core material; and the outer packing material includes a thermally weldable film and a gas barrier film; the gas barrier film includes a base material and a metal aluminum film formed on one surface of the base material; and the metal aluminum film satisfies the below formula (1) and formula (2):

$$1.0*10^{-3} \leq (I_A/I_B)/T \leq 3.5*10^{-3} \quad (1)$$

$$(A/B)/T \geq 3.8*10^{-3} \quad (2).$$

In the formula (1) and the formula (2), $I_A$ represents a peak intensity (cps) of a diffraction peak positioned at 2 $\theta=38.5°\pm1.0°$ measured for the metal aluminum film in a X-ray diffraction measurement using a CuKα-ray; $I_B$ represents a peak intensity (cps) of a diffraction peak positioned at 2 $\theta=44.6°\pm1.0°$ measured for the metal aluminum foil in a X-ray diffraction measurement using a CuKα-ray; A represents a peak intensity (kcps) of an aluminum element in the metal aluminum film measured in a fluorescent X-ray analysis; B represents a peak intensity (kcps) of an aluminum element in a metal aluminum foil measured in a fluorescent X-ray analysis; and T represents a thickness (nm) of the metal aluminum film.

Advantageous Effects

With the outer packing material for vacuum insulation material of the present disclosure, the initial water vapor barrier properties are excellent and degrade in water vapor barrier properties due to bend can be inhibited.

DESCRIPTION OF EMBODIMENTS

Figure 1:
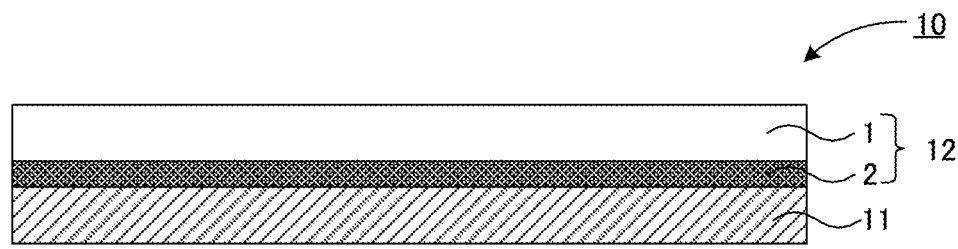
FIG. 1 is a schematic cross-sectional view illustrating an example of the outer packing material for vacuum insulation material of the present disclosure.

Embodiments of the present disclosure are hereinafter explained with reference to, for example, drawings. However, the present disclosure is enforceable in a variety of different forms, and thus should not be taken as is limited to the contents described in the embodiment exemplified as below. Also, the drawings may show the features of the invention such as width, thickness, and shape of each part schematically in order to explain the invention more clearly in some cases comparing to the actual form; however, it is merely an example, and thus does not limit the interpretation of the present disclosure. Also, in the specification and each drawing, for the factor same as that described in the figure already explained, the same reference sign is indicated and the explanation thereof may be omitted. In addition, for the convenience of explanation, explanation may be made using the terms upward or downward in some cases, but the direction of up and down may be reversed.

Also, in the present descriptions, when some structure in some member or some region and the like is described to be "on (or below)" the other structure in other member or the other region and the like, unless otherwise stated, it is not just the case of being directly on (or directly below) the other structure, but the case of being upward (or downward) the other structure is also included; it means it also includes the case an additional structural element is included in between the upward (or downward) the other structure.

The outer packing material for vacuum insulation material, the vacuum insulation material, and the article provided with vacuum insulation material of the present disclosure are hereinafter described in details. Incidentally, in the present disclosure, "sheet" and "film" may be used in the same meaning in some cases.

A. Outer Packing Material For Vacuum Insulation Material

The outer packing material for vacuum insulation material of the present disclosure comprises a thermally weldable film and a gas barrier film; wherein the gas barrier film includes a base material and a metal aluminum film formed on one surface of the base material; and the metal aluminum film satisfies the below formula (1) and formula (2):

$$1.0*10^{-3} \leq (I_A/I_B)/T \leq 3.5*10^{-3} \quad (1)$$

$$(A/B)/T \geq 3.8*10^{-3} \quad (2).$$

In the formula (1) and the formula (2), $I_A$ represents a peak intensity (cps) of a diffraction peak positioned at 2 $\theta=38.5°\pm1.0°$ measured for the metal aluminum film in a X-ray diffraction measurement using a CuKα-ray; $I_B$ represents a peak intensity (cps) of a diffraction peak positioned at 2 $\theta=44.6°\pm1.0°$ measured for the metal aluminum foil in a X-ray diffraction measurement using a CuKα-ray; A represents a peak intensity (kcps) of an aluminum element in the metal aluminum film measured in a fluorescent X-ray analysis; B represents a peak intensity (kcps) of an aluminum element in a metal aluminum foil measured in a fluorescent X-ray analysis; and T represents a thickness (nm) of the metal aluminum film.

FIG. 1 is a schematic cross-sectional view illustrating an example of the outer packing material for vacuum insulation material of the present disclosure. Outer packing material for vacuum insulation material 10 of the present disclosure comprises thermally weldable film 11 and gas barrier film 12 formed on one surface of the thermally weldable film 11. The gas barrier film 122 includes base material 1 and metal aluminum film 2 formed on one surface of the base material 1, and the metal aluminum film 2 satisfies the above formula (1) and formula (2).

According to the present disclosure, the metal aluminum film in the gas barrier film satisfies the above formula (1) and formula (2) so as to form a film state having high film density and high crystallinity. Thereby, the gas barrier film can achieve high water vapor barrier properties from the initial stage. Also, defects in the metal aluminum film do not easily occur even when bending stress is applied, and thus degrade in water vapor barrier properties due to the occurrence of defects can be inhibited. The outer packing material for vacuum insulation material of the present disclosure includes such a gas barrier film in the constitution, and thus the initial water vapor barrier properties are excellent and degrade in water vapor barrier properties due to bend can be inhibited.

In the present disclosure, the metal aluminum film is a thin film mainly composed of metal aluminum which is formed by a vapor deposition method using metal aluminum as the source of aluminum, and is distinguished from a metal aluminum foil from the points of film forming method and thickness. Incidentally, the thickness of the metal aluminum foil is generally a few μm to a few hundred μm. Also, the metal aluminum film in the present disclosure is distinguished from an aluminum compound film, such as an aluminum oxide film and an aluminum hydroxide film, which is mainly composed of aluminum compound. The aluminum compound film is formed by, for example, a vapor deposition method using an aluminum compound as the source of aluminum. The metal aluminum as the source of aluminum may include impurities. The metal aluminum film partially oxidized or hydroxylated over time and changed to aluminum compound can also be categorized as the metal aluminum film.

In the present disclosure, the metal aluminum film "formed on one surface of the base material" means that the metal aluminum film is formed directly on one surface of the base material.

Hereinafter, each constitution of the outer packing material for vacuum insulation material of the present disclosure is explained in details.

1. Gas Barrier Film

The gas barrier film in the present disclosure includes a base material and a metal aluminum film formed on one surface of the base material, and the metal aluminum film satisfies the above formula (1) and formula (2). In the outer packing material for vacuum insulation material of the present disclosure, the gas barrier film is formed on one surface of the thermally weldable film.

(1) Metal Aluminum Film

The metal aluminum film is formed on one surface of the base material, and satisfies the relationships of the below formula (1) and formula (2):

$$1.0*10^{-3} \leq (I_A/I_B)/T \leq 3.5*10^{-3} \quad (1)$$

$$(A/B)/T \geq 3.8*10^{-3} \quad (2).$$

In the formula (1) and the formula (2), $I_A$ represents a peak intensity (cps) of a diffraction peak positioned around $2\theta=38.5°$ measured for the metal aluminum film in a X-ray diffraction measurement using a CuKα-ray; $I_B$ represents a peak intensity (cps) of a diffraction peak positioned around $2\theta=44.6°$ measured for the metal aluminum foil in a X-ray diffraction measurement using a CuKα-ray; A represents a peak intensity (kcps) of an aluminum element in the metal aluminum film measured in a fluorescent X-ray analysis; B represents a peak intensity (kcps) of an aluminum element in a metal aluminum foil measured in a fluorescent X-ray analysis; and T represents a thickness (nm) of the metal aluminum film.

The film state of the metal aluminum film, specifically the crystallinity and the film density of the metal aluminum film can be specified with the above formulas (1) and (2).

The "$(I_A/I_B)/T$" in the above formula (1) specifies the crystallinity of the metal aluminum film. Larger value of $(I_A/I_B)/T$ indicates higher crystallinity of the metal aluminum film, and smaller value indicates lower crystallinity of the metal aluminum film. If the crystallinity of the metal aluminum film is too high, the film hardness would be high to easily cause breakout with respect to distortion due to change in form such as bend. Accordingly, degrade in water vapor barrier properties due to band may easily occur in some cases. On the other hand, if the crystallinity is too low, it may be difficult to achieve high water vapor barrier properties in the initial stage in some cases.

Here, the crystallinity of the metal aluminum film can be specified with the value $(I_A/I_B)/T$ because in consideration of the sensitivity of the measurement device, a peak $I_B$ around $2\theta=44.6°$ in an X-ray diffraction measurement using a CuKα-ray of a metal aluminum foil having a specific alloy number (alloy number A8021, thickness 6 µm or more) is used as a reference peak so as to be utilized as a generalized crystallinity index. Therefore, in the X-ray diffraction measurement of the metal aluminum foil using a CuKα-ray, using a peak intensity $I_B$ of the diffraction peak positioned around $2\theta=44.6°$ as a reference, a peak intensity $I_A$ of the diffraction peak positioned around $2\theta=38.5°$ in an X-ray diffraction measurement of the metal aluminum film using a CuKα-ray is converted to a relative intensity when the value of $I_B$ is 1, and divided by the thickness of the metal aluminum film so as to specify the crystallinity of the metal aluminum film per a unit thickness.

The value of $(I_A/I_B)/T$ is $1.0*10^{-3}$ or more, but above all, preferably $1.4*10^{-3}$ or more, and more preferably $1.5*10^{-3}$ or more. Also, the value of $(I_A/I_B)/T$ is $3.5*10^{-3}$ or less, but above all, preferably $3.0*10^{-3}$ or less, and more preferably $2.5*10^{-3}$ or less. When the $(I_A/I_B)/T$ is in the above range, the metal aluminum film may be a crystalline metal aluminum film having well-balanced film hardness and water vapor barrier properties in a normal state so as to achieve excellent initial water vapor barrier properties, as well as to inhibit degrade in water vapor barrier properties due to bend. Incidentally, the unit of the value $(I_A/I_B)/T$ may be $(nm^{-1})$.

The $I_A$ in the above formula (1) represents a peak intensity of the diffraction peak positioned around $2\theta=38.5°$ in an x-ray diffraction measurement of the metal aluminum film using a CuKα-ray. Around $2\theta=38.5°$ refers to the range of $2\theta=38.5°\pm1.0$ in specific. The value of $I_A$ is not particularly limited if the value of $(I_A/I_B)/T$ becomes the above described range.

The value of $I_A$ in the above formula (1) is the height of the diffraction peak positioned around $2\theta=38.5°$ in a diffraction spectrum obtained in an X-ray diffraction measurement of the metal aluminum film as a measurement surface, with the conditions described below. In details, a sample in a desired size is cut out from the outer packing material for vacuum insulation material, the outer periphery of the cut-out sample is fixed with a curing resin, cut off in the thickness direction with a diamond knife, and the cross-section of the exposed metal aluminum film is used as the measurement surface to conduct the X-ray diffraction measurement in the below conditions. Alternatively, when the other member arranged on the surface of the metal aluminum film side, which is opposite to the base material side, is dissolvable in a solvent, the other member may be wiped off with an appropriate solvent, and the exposed metal aluminum film surface may be used as the measurement surface to conduct the X-ray diffraction measurement with the conditions described below. The measurement can be conducted using a general X-ray diffraction device; for example, SmartLab from Rigaku Corporation can be used. Incidentally, in order to exclude the influence of amorphous halo peak, a wave form with the half value width in the obtained diffraction spectrum being 6° or less is defined as a diffraction peak. The measurement is conducted at 3 points or more in the outer packing material for insulation material and the average value thereof is regarded as the value of $I_A$ of the metal aluminum film in that outer packing material for vacuum insulation material.

<Conditions for X-Ray Diffraction Measurement>

Light source: CuKα-ray (wavelength: 1.5418 A)

Scanning axis: $2\theta/\theta$

Tube voltage: 45 kV

Tube current: 200 mA

Optical system: parallel beam optical system

Slit structure: Incident side slit (solar slit 5.0°, incident slit 5 mm), light reception side slit (parallel slit analyzer (PSA) 0.5°)

Detector: SC-70

Measurement range: $2\theta=3°$ to 80°

Scanning speed: 6.0°/min.

Scanning step: 0.01°

Also, the $I_B$ in the above formula (1) represents a peak intensity of the diffraction peak positioned around $2\theta=44.6°$ in an X-ray diffraction measurement for the metal aluminum foil using a CuKα-ray. Around 2 θ=44.6° refers to the range of 2 θ=44.6°±1.0° in specific. The value of $I_B$ is not particularly limited if the value of $(I_A/I_B)/T$ becomes the above described range.

The value of $I_B$ in the above formula (1) is the height of the diffraction peak positioned around 2 θ=44.6° in a diffraction spectrum obtained in an X-ray diffraction measurement of the metal aluminum foil having a thickness of 6.0 μm (BESPA from UACJ), using the mirror surface of the metal aluminum foil as a measurement surface, with the same measurement conditions as those for the value of $I_A$. Incidentally, in order to exclude the influence of amorphous halo peak, a wave form with the half value width in the obtained diffraction spectrum being 6° or less is defined as a diffraction peak. The measurement is conducted at 3 points or more in the aluminum foil and the average value thereof is regarded as the value of $I_B$ of that metal aluminum foil.

The "T" in the above formula (1) represents the thickness of the metal aluminum film. The value of T in the above formula (1) is appropriately determined depending on factors such as methods and conditions for forming the metal aluminum film, but the thickness may be 5 nm or more for example, and preferably 10 nm or more. Also, the value of the T may be 200 nm or less, and preferably 150 nm or less.

The "T" in the above formula (1) is a value measured by the following method. First, a sample in a desired size is cut out from the outer packing material for vacuum insulation material, and the outer periphery of the sample is fixed with a curing resin. The fixed sample is cut in the thickness direction with a diamond knife to expose the cross-section, or cut out a piece, and the image of the exposed cross-section or the cut piece is obtained using a scanning electron microscope (SEM) or a scanning transmission electron microscope (STEM). The image of the cross-section to be obtained by the observation with the scanning electron microscope (SEM) is approximately magnification of one hundred thousand, and the image of the cut piece to be obtained by the observation with the scanning transmission electron microscope (STEM) is approximately magnification of two hundred thousand. The scanning electron microscope (SEM) or the scanning transmission electron microscope (STEM) may be a device commercially available, such as SU-8000 from Hitachi High-Tech Corporation. In the obtained image, the thickness of the metal aluminum film at 3 points in about equal distance is respectively measured. This operation is conducted for three of the sample per one outer packing material for vacuum insulation material, and the average of the measured values of the thickness at totally 9 points is regarded as the thickness (T in the above formula (1)) of the metal aluminum film in that outer packing material for vacuum insulation material.

Meanwhile, the (A/B)/T in the above formula (2) specifies the film density of the metal aluminum film. Larger value of the (A/B)/T indicates higher film density of the metal aluminum film, and smaller value indicates lower density of the metal aluminum film. The higher the film density of the metal aluminum film is, the more the metal aluminum film is capable of achieving higher water vaper barrier properties in the initial stage. On the other hand, if the film density is too low, defect may be easily caused during the film formation of the metal aluminum film due to voids and impurities present in the film, distortion, and nonuniformity of the film; as a result, it may be difficult to achieve high water vapor barrier properties in the initial stage in some cases due to the presence of the defect. Also, in the metal aluminum film with low film density, breakout due to bend may easily occur in some cases.

Here, the value of (A/B)/T can specify the film density of the metal aluminum film because in consideration of the sensitivity of the measurement device, a peak intensity B of an aluminum element of a metal aluminum foil having specific alloy number (alloy number A8021, thickness 6 μm or more) measured by a fluorescent X-ray analysis is used as a reference so as to be utilized as a generalized crystallinity index. Therefore, using the peak intensity (kcps) B of the aluminum element of the metal aluminum foil measured by the fluorescent X-ray analysis as a reference, a peak intensity (kcps) A of the aluminum element of the metal aluminum film measured by the fluorescent X-ray analysis is converted to a relative intensity when the value of B is 1, and divided by the thickness of the metal aluminum film, and thereby the film density of the metal aluminum film per a unit thickness can be specified.

The value of (A/B)/T is $3.8*10^{-3}$ or more, but above all, preferably $3.9*10^{-3}$ or more, and more preferably $4.0*10^{-3}$ or more. When the value of (A/B)/T is in the above range, the metal aluminum film may have film density with well-balanced film formability, film hardness and water vapor barrier properties in a normal state to achieve excellent initial water vapor barrier properties, as well as to inhibit degrade in water vapor barrier properties due to bend. Incidentally, the upper limit of the value of (A/B)/T is not particularly limited, but the value may be $9.0*10^{-3}$ or less for example, and above all, it may be $7.0*10^{-3}$ or less. Also, the unit of the value (A/B)/T may be ($nm^{-1}$).

The "A" in the above formula (2) represents a peak intensity (also referred to as AlKα-ray intensity or NET intensity) of the metal aluminum element of the metal aluminum film measured by a fluorescent X-ray analysis. The value of A is not particularly limited if the value of (A/B)/T becomes the above described range.

The value of A in the above formula (2) is the height of the peak of AlKα-ray obtained by the fluorescent X-ray analysis for the metal aluminum film as a measurement surface with the conditions described below, from the baseline to the range of 140° to 148° connected in a straight line. In details, from the outer packing material for vacuum insulation material, the surface of the metal aluminum film in the gas barrier film is exposed by peeling the other layer, and the fluorescent X-ray analysis is conducted to the exposed metal aluminum film with below conditions. Alternatively, when the other member arranged on the surface of the metal aluminum film opposite to the base material side can be dissolved in a solvent, the other member may be wiped off with an appropriate solvent and the fluorescent X-ray analysis may be conducted to the exposed metal aluminum film surface as the measurement surface with the below conditions. The measurement can be conducted using a general fluorescent X-ray analysis device. For example, RIX-3100 (wavelength dispersion type fluorescent X-ray analysis device from Rigaku Corporation) can be used as the device. The measurement is conducted at 3 points or more in the outer packing material for vacuum insulation material, and the average value thereof is regarded as the value of A of the metal aluminum film in that outer packing material for vacuum insulation material.

<Conditions for Fluorescent X-Ray Analysis>
X-ray source: Rh bulb•4.0 kW
Measurement vacuum degree: 13 Pa
Excitation conditions:
Tube voltage 50 kV, tube current 80 mA Measurement diameter (X-ray irradiation range): 30 mm
(1)
Measurement 2θ angle: 140° to 148°
Measurement element: Al (metal aluminum)

The "B" in the above formula (2) represents the peak intensity (also referred to as AlKα-ray intensity or NET intensity) of the aluminum element of the metal aluminum foil measured by a fluorescent X-ray analysis. The value of B is not particularly limited if the value of (A/B)/T becomes the above described range.

The value of B in the above formula (2) is the height of the peak of AlKα-ray obtained by the fluorescent X-ray analysis for the metal aluminum foil using the mirror surface as the measurement surface from the baseline to the range of 140° to 148° connected in a straight line, the metal aluminum foil used is 6.0 μm thick metal aluminum foil (BESPA from UACJ), and the measurement conditions are the same as those for the value of A. The measurement is conducted at 3 points or more in the metal aluminum foil, and the average value thereof is regarded as the value of B of that metal aluminum foil.

The "T" in the above formula (2) represents the thickness of the metal aluminum film. The value of T in the above formula (2) and the measurement method therefor are the same as the value of T in the above formula (1) and the measurement method therefor described above.

(2) Base Material

The base material is not particularly limited if it is a member that supports the metal aluminum film, and for example, a resin base material is suitably used. Specific examples of the resin base material may include a resin film of polyolefin such as polyethylene (PE) and polypropylene (PP); a resin film of polyester such as polyethylene terephthalate (PET), polyethylene naphthalate (PEN), and polybutylene terephthalate (PBT); a cyclic olefin copolymer film; a cyclic olefin polymer film; a polystyrene resin film; an acrylonitrile-styrene copolymer (AS resin) film; an acrylonitrile-butadiene-styrene copolymer (ABS resin) film; a poly (meth) acryl resin film; a polycarbonate resin film; a resin film basing polyvinyl alcohol such as polyvinyl alcohol (PVA) and an ethylene-vinyl alcohol copolymer (EVOH); a saponified ethylene-vinyl ester copolymer film; a resin film of polyamide such as various nylons; a polyimide resin film; a polyurethane resin film; an acetal resin film; a resin film of cellulose such as triacetyl cellulose (TAC); and other various resin films or sheets. Among them, a polyester resin film is preferable, and a PET film is more preferable because it has heat resistance and resilience so that the metal aluminum film is more easily formed by the vapor deposition method.

The base material may include an arbitrary additive such as a blocking inhibitor, a heat stabilizer, an antioxidant, and a chlorine trapping agent.

The thickness of the base material may be a thickness having strength with which the metal aluminum film can be supported, and not particularly limited, but for example, may be 2 μm or more and 40 μm or less.

The base material may or may not be flexible, but is preferably flexible. Also, the base material may or may not have light transmittance. In addition, the base material may be transparent, may be semitransparent, and may be opaque.

To the base material, a surface treatment may be conducted to a surface that contacts with the metal aluminum film. Also, in the base material, an arbitrary layer such as a primer layer and an undercoating layer may be arranged on a surface that contacts with the metal aluminum film. The reason therefor is to increase adhesiveness to the metal aluminum film.

(3) Other Constitutions

The gas barrier film may include a barrier overcoating film on the metal aluminum film side surface or the base material side surface. Gas barrier properties to be exhibited by the gas barrier film can be improved when the barrier overcoating film is arranged on one surface of the gas barrier film.

Materials for the barrier overcoating layer are not particularly limited, and examples thereof may include a gas barrier resin composition comprising a metal oxide phosphoric acid including a M—O—P bond (here, M represents a metal atom, O represents an oxygen atom, and P represents a phosphorus atom), a zinc acrylate, a gas barrier resin compound comprising a resin and an inorganic layer shape compound; and a sol-gel polycondensate of at least one kind or more of alkoxide represented by a general formula $R^1$ nM $(OR^2)$m (provided that in the formula, $R^1$ and $R^2$ each represents an organic group having 1 to 8 carbon atoms, M represents a metal atom, n represents an integer of 0 or more, m represents an integer of 1 or more, and n+m represents the valence of M) and a water-soluble polymer.

(4) Properties

The lower the water vapor permeability of the gas barrier film, the more preferable; for example, the permeability is preferably 0.5 g/($m^2$·day) or less, and above all, preferably 0.2 g/($m^2$·day) or less, and particularly preferably 0.1 g/($m^2$·day) or less. The above described value of the water vapor permeability may be the initial water vapor permeability of the gas barrier film.

The water vapor permeability of the gas barrier film may be measured using a water vapor permeability measurement device in the conditions of at a temperature of 40° C. and relative humidity difference of 90% RH in accordance with JIS K 7129:2008 (Annex B: Infrared sensor method). The measurement of the water vapor permeability may be conducted in the following steps. First, the metal aluminum film side surface of the gas barrier film is laminated to a PET film (Emblet™-PTMB from UNITIKA LTD.) having a thickness of 12 μm with an adhesive agent (main agent: RU-77T and curing agent: H-7 from ROCK PAINT Co., Ltd.) to produce a sample. A test piece in a desired size is cut out from the sample, and the test piece is installed between an upper room and a lower room of the water vapor permeability measurement device so that the metal aluminum film side surface of the gas barrier film comes to a high humidity side (water vapor supplying side), and the measurement is conducted to an area for permeability set as approximately 50 $cm^2$ (region for permeability: circle having a diameter of 8 cm) in conditions of a temperature of 40° C. and relative humidity difference of 90% RH. As the water vapor permeability measurement device, for example, "PERMATRAN" from U.S. MOCON may be used. The measurement of the water vapor permeability is conducted for at least 3 pieces of the sample per one gas barrier film, and the average of these measured values may be regarded as the value of the water vapor permeability in that condition.

Also, the water vapor barrier properties of the gas barrier film may be specified by a pseudo water vapor permeability coefficient. The pseudo water vapor permeability coefficient is to indicate the water vapor permeability of the metal aluminum film in the gas barrier film per unit thickness, and represented by the product of the water vapor permeability measured in the above described method and the thickness of the metal aluminum film. The lower the pseudo water vapor permeability coefficient of the gas barrier film, the more preferable; for example, the coefficient is preferably 30 (g·nm)/($m^2$·day) or less, above all, preferably 20 (g·nm)/

(m²·day) or less, and particularly preferably 15 (g·nm)/(m²·day) or less. The value of the pseudo water vapor permeability coefficient may be regarded as the initial pseudo water vapor permeability coefficient.

Regarding the pseudo water vapor permeability coefficient of the gas barrier film, the water vapor permeability of at least three test pieces per one gas barrier film is obtained, and the value of the product of the average of the obtained water vapor permeability and the thickness of the metal aluminum film is regarded as the pseudo water vapor permeability coefficient in that condition. The thickness of the metal aluminum film is the value (average value) obtained with the measurement method described in the section "(1) Metal aluminum film" above.

In addition, the lower the oxygen permeability of the gas barrier film, the more preferable; for example, the oxygen permeability is preferably 0.5 cc/(m²·day·atm) or less, and above all, more preferably 0.2 cc/(m²·day·atm) or less. The value of the oxygen permeability may be regarded as the initial oxygen permeability of the gas barrier film.

The oxygen permeability of the gas barrier film may be measured using an oxygen gas permeability measurement device with reference to JIS K7126-2:2006 (Plastic—film and sheet—gas permeability test method—Section 2: Isopiestic method, Annex A: Test method of oxygen gas permeability with electrolytic sensor method) in the conditions of a temperature of 23° C. and a humidity of 60% RH. As the oxygen permeability measurement device, for example, "OXTARAN" from U.S. MOCON may be used. For the measurement, similarly to the measurement for the water vapor permeability, the metal aluminum film side surface of the gas barrier film is laminated to a PET film to produce a sample, and a test piece in a desired size is cut out from the sample for the use of the measurement. The measurement of the oxygen permeability is conducted for at least three test pieces per one gas barrier film, and the average of the measured values may be regarded as the value of the oxygen permeability in that condition.

(5) Production Method

The method for producing the gas barrier film is not particularly limited if the metal aluminum film provided with the above formulas (1) and (2) can be formed therewith, and examples thereof may include a resistance heating vacuum vapor deposition method. In specific, examples of the method may include one in which the base material is set to an unwinding device, and the base material is made running to let through a decompressed vacuum vapor deposition device, and in the vacuum vapor deposition device, an aluminum wire is fed to a resistance heating part, and a metal aluminum melted and vaporized is deposited and adhered to one surface of the base material running. On this occasion, the values in the above formulas (1) and (2) of the metal aluminum film to be obtained may be adjusted depending on the relation between the running speed of the base material and the power supplying value to the resistance heating part (power value of vapor deposition board), and the time of letting the base material through the vacuum vapor deposition device (that is the time of vapor deposition).

In the above production method, for example, the crystallinity of the metal aluminum film can be improved by increasing the power value of vapor deposition board. The reason therefor is presumably as below. That is, when the power value of vapor deposition board is higher, vaporization amount of the metal aluminum (metal aluminum vapor amount) increases more and the heat energy of the metal aluminum vapor also increases; thus, crystal is presumably easily formed during the metal aluminum is deposited and adhered to the base material. Incidentally, if the power value of vapor deposition board is too high, materials such as impurities vaporized together with the metal aluminum may be mixed in the metal aluminum film in some cases. Also, when the heat energy increases too much due to causes such as generation of the crystallization energy of the metal aluminum and generation of radiant heat from the vapor deposition board side in some cases, and a defect may be caused in the metal aluminum film during the metal aluminum is deposited and adhered to the base material in some cases, and the metal aluminum may fall out from the film to cause crystal defect in some cases. On the other hand, if the power value of vapor deposition board is too low, the vaporization amount of the metal aluminum (metal aluminum vapor amount) may not be sufficiently obtained, and thus the desired thickness of the metal aluminum film is not easily obtained in some cases.

In addition, in the above production method, for example, the film density of the metal aluminum film may be decreased by slowing the running speed of the base material. The reason therefor is presumably as below. That is, when the power value of vapor deposition board is high, radiant heat is generated and the base material is exposed to the radiant heat for a long time if the running speed of the base material is slow. The surface temperature of the base material rises due to the heat energy and a slight deformation occurs so that the vaporized metal aluminum is not adhered and deposited densely; as a result, voids are presumably generated in the film to decrease the film density.

2. Thermally Weldable Film

The thermally weldable film in the present disclosure is a film that can be welded by heating thereof. The thermally weldable film is the outermost layer on one side of the outer packing material for vacuum insulation material of the present disclosure in the thickness direction (layering direction), and is a member working as an outermost surface of one side. Also, the thermally weldable film contacts with a core material when a vacuum insulation material is manufactured using the outer packing material for vacuum insulation material of the present disclosure, and it is a member for bonding the edge of the outer packing materials for vacuum insulation material facing to each other when the core material is enclosed therein.

As the thermally weldable film, a resin film that can be melted and fused by heating can be used. Examples of such a resin film may include a resin film basing polyolefin such as polyethylene such as straight chain-shaped short chain branched polyethylene (LLDPE), and an unstretched polypropylene (CPP), a resin film basing polyester such as polyethylene terephthalate (PET), polyethylene naphthalate (PEN), and polybutylene terephthalate (PBT), a polyvinyl acetate-based resin film, a polyvinyl chloride-based resin film, a poly (meth) acrylic resin film, and an urethane resin film.

The thermally weldable film may include an additional material such as an anti-blocking agent, a lubricant, a flame retardant, and a filler material.

The thickness of the thermally weldable film may be in the thickness with which desired adhesiveness is obtained when the outer packing materials for vacuum insulation material facing to each other are bonded; for example, it is within the range of 15 μm or more and 100 μm or less, preferably within the range of 25 μm or more and 90 μm or less, and more preferably within the range of 30 μm or more and 80 μm or less.

3. Arbitrary Constitution

The outer packing material for vacuum insulation material of the present disclosure comprises at least a thermally weldable film and a gas barrier film. The outer packing material for vacuum insulation material of the present disclosure may include one gas barrier film, and may include two or more thereof. Also, when the outer packing material for vacuum insulation material of the present disclosure comprises two or more of the gas barrier film, at least one of the two or more of the gas barrier film has the constitution explained in the section "1. Gas barrier film" above, all of the two or more of the gas barrier film may have the constitution explained in the section "1. Gas barrier film" above, and a gas barrier film having a constitution other than the constitution explained in the section "1. Gas barrier film" may be included.

In addition, the outer packing material for vacuum insulation material of the present disclosure may have an arbitrary constitution other than the thermally weldable film and the gas barrier film. Examples of the arbitrary constitution may include a protective film and an interlayer adhesive layer.

The outer packing material for vacuum insulation material of the present disclosure may include a protective film on the outermost of the gas barrier film which is opposite side to the thermally weldable film side. When two ore more of the gas barrier film are included, the protective film may be included on a side of the gas barrier film positioned most distantly from the thermally weldable film (the outermost gas barrier film) which is the opposite side to the thermally weldable film side. The protective film is arranged in the above described position and thus the film works as an outermost surface of the outer packing material for vacuum insulation material of the present disclosure which is opposite side surface to the thermally weldable film side in the thickness direction (layering direction), so as to protect the constituting members of the outer packing material for vacuum insulation material other than the protective film from damages and deterioration.

As the protective film, a generally used resin film that shows higher melting point than that of the thermally weldable film can be used. Above all, the protective film is preferably at least one kind selected from the group constituting of a nylon film, a PET film, a PBT film, and a PP film. Also, the thickness of the protective film is not particularly limited, and can be appropriately determined.

In addition, the outer packing material for vacuum insulation material of the present disclosure may include an interlayer adhesive layer. As a material for the interlayer adhesive layer, conventionally known adhesive agents can be used. The interlayer adhesive layer may be, for example, positioned between the thermally weldable film and the gas barrier film, between two gas barrier films, and between the gas barrier film and the protective film.

4. Others

The lower the water vapor permeability of the outer packing material for vacuum insulation material of the present disclosure, the more preferable; for example, it is preferably 0.1 g/(m$^2$·day) or less, and above all, preferably 0.05 g/(m$^2$·day) or less, and particularly preferably 0.01 g/(m$^2$·day) or less. The value of the water vapor permeability can be the initial water vapor permeability of the outer packing material for vacuum insulation material.

The water vapor permeability of the outer packing material for vacuum insulation material may be measured using a water vapor permeability measurement device in the conditions of at a temperature of 40° C. and relative humidity difference of 90% RH in accordance with ISO 15106-5: 2015 (differential pressure method). The initial water vapor permeability measurement may be conducted in the following steps. First, a sample of the outer packing material cut out in a desired size is installed between an upper room and a lower room of the device so as the outermost which is opposite side to the thermally weldable film in the thickness direction (layering direction) among the outermost surfaces opposing to each other comes to high humidity side (water vapor supplying side), and the measurement is conducted to the permeation area of approximately 50 cm$^2$ (permeation region: circle having the diameter of 8 cm) in the conditions of at a temperature of 40° C. and relative humidity difference of 90% RH. As the water vapor permeability measurement device, for example, "DELTAPERM" from U.K. Technolox Ltd. may be used. The measurement of the water vapor permeability is conducted for at least 3 pieces of the sample per one outer packing material for vacuum insulation material, and the average of these measured values is regarded as the value of water vapor permeability in that condition.

Also, the lower the oxygen permeability of the outer packing material for vacuum insulation material of the present disclosure, the more preferable; for example, it is preferably 0.1 cc/(m$^2$·day·atm) or less, and above all, more preferably 0.05 cc/(m$^2$·day·atm) or less. The value of the oxygen permeability is regarded as the initial oxygen permeability of the outer packing material for vacuum insulation material.

The oxygen permeability of the outer packing material for vacuum insulation material may be measured using an oxygen gas permeability measurement device with reference to JIS K7126-2:2006 (Plastic—film and sheet—gas permeability test method—Section 2: Isopiestic method, Annex A: Test method of oxygen gas permeability with electrolytic sensor method) in the conditions of at a temperature of 23° C. and a humidity of 60% RH. As the oxygen permeability measurement device, for example, "OXTARAN" from U.S. MOCON may be used. The measurement of the oxygen permeability is conducted for at least 3 pieces of the sample per one outer packing material for vacuum insulation material, and the average of these measured values is regarded as the value of oxygen permeability in that condition.

The thickness of the outer packing material for vacuum insulation material of the present disclosure is not particularly limited, and can be appropriately determined. The thickness is preferably a size capable of including the above described properties, and it depends on the layer structure, but for example, it is 30 μm or more and may be preferably 50 μm or more, and also, the thickness is, for example, 200 μm or less, and may be preferably 150 μm or less.

5. Production Method

There are no particular limitations on the method for producing the outer packing material for vacuum insulation material of the present disclosure, and a known method may be used. Examples of the method may include a dry lamination method in which the thermally weldable film and the gas barrier film are formed in advance and bonded interposing the interlayer adhesive layer, and a method in which the thermally weldable film is extruded and formed directly on one surface of the gas barrier film, or on the interlayer adhesive layer formed on one surface of the gas barrier film.

6. Applications

The outer packing material for vacuum insulation material of the present disclosure may be used as an outer packing material that covers a core material in a vacuum insulation material. The outer packing material for vacuum insulation material of the present disclosure is used in the manner positioned in a vacuum insulation material so as the thermally weldable films come to the core material side and to face each other interposing a core material, and the outer periphery thereof is sealed.

B. Vacuum Insulation Material

The vacuum insulation material of the present disclosure is a member comprising a core material, and an outer packing material enclosing the core material; wherein the outer packing material includes a thermally weldable film and a gas barrier film; the gas barrier film includes a base material and a metal aluminum film formed on one surface of the base material; and the metal aluminum film satisfies the below formula (1) and formula (2):

$$1.0*10^{-3} \leq (I_A/I_B)/T \leq 3.5*10^{-3} \quad (1)$$

$$(A/B)/T \geq 3.8*10^{-3} \quad (2).$$

In the formula (1) and the formula (2), $I_A$ represents a peak intensity (cps) of a diffraction peak positioned at 2 $\theta=38.5°\pm1.0°$ measured for the metal aluminum film in a X-ray diffraction measurement using a CuKα-ray; $I_B$ represents a peak intensity (cps) of a diffraction peak positioned at 2 $\theta=44.6°\pm1.0°$ measured for the metal aluminum foil in a X-ray diffraction measurement using a CuKα-ray; A represents a peak intensity (kcps) of an aluminum element in the metal aluminum film measured in a fluorescent X-ray analysis; B represents a peak intensity (kcps) of an aluminum element in a metal aluminum foil measured in a fluorescent X-ray analysis; and T represents a thickness (nm) of the metal aluminum film.

Figure 2A:
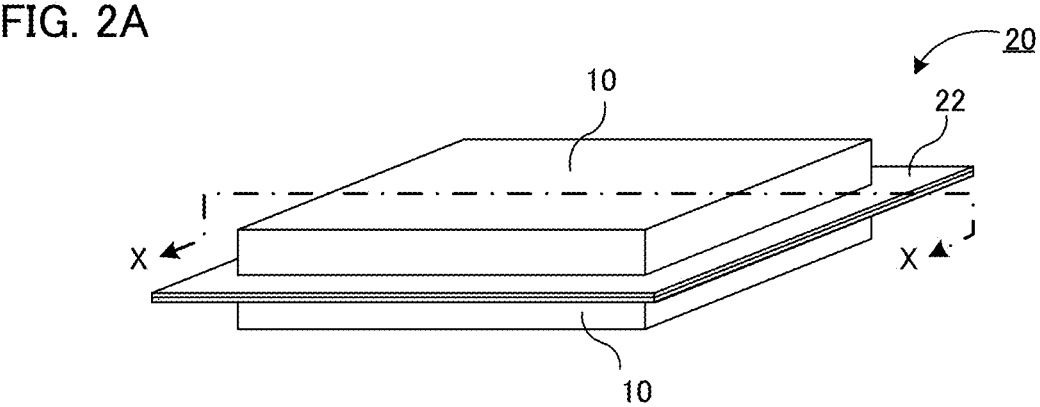
FIGS. 2A and 2B are a schematic perspective view and a cross-sectional view respectively illustrating an example of the vacuum insulation material of the present disclosure.
Figure 2B:
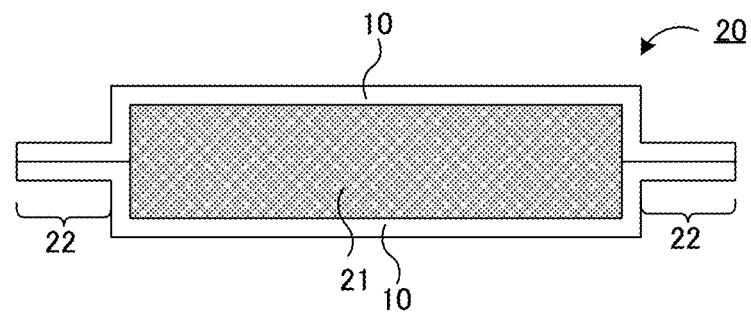

FIG. 2A is a schematic perspective view illustrating an example of the vacuum insulation material of the present disclosure, and FIG. 2B is a cross-sectional view of X-X line in FIG. 2A. Vacuum insulation material 20 illustrated in FIGS. 2A and 2B is respectively a member comprising core material 21 and outer packing material 10 enclosing the core material 21, and the outer packing material 10 is the outer packing material for vacuum insulation material 10 illustrated in FIG. 1. In the vacuum insulation material 20 illustrated in FIGS. 2A and 2B, a pair of the outer packing material 10 is positioned so as each of the thermally weldable film faces to each other interposing the core material 21, and the core material 21 is enclosed in the manner that the outer periphery edge part 22 of the outer packing material 10 is bonded and sealed. Internal pressure of the vacuum insulation material 20 is decompressed, which is in a state of lower pressure than the atmospheric pressure.

According to the present disclosure, the outer packing material constituting the vacuum insulation material is the outer packing material for vacuum insulation material explained in the section "A. Outer packing material for vacuum insulation material" above, and thus the initial water vapor barrier properties are excellent, and degrade in water vapor barrier properties due to bend can be inhibited. Thereby, the water vapor barrier properties of the outer packing material allow the vacuum insulation material of the present disclosure to achieve high thermal insulation properties from the initial stage. Also, degrade in water vapor barrier properties of the outer packing material due to bend is inhibited in the vacuum insulation material of the present disclosure, and thus the thermal insulation properties can be maintained for a long period of time even when it is used in a bent form.

Hereinafter, each constitution of the vacuum insulation material of the present disclosure is explained.

1. Outer Packing Material

The outer packing material in the vacuum insulation material of the present disclosure is a member in which the core material is enclosed. The outer packing material includes a thermally weldable film and a gas barrier film, and the gas barrier film includes a base material and a metal aluminum film formed on one surface of the base material, and the metal aluminum film satisfies the above formula (1) and formula (2).

The outer packing material in the vacuum insulation material of the present disclosure is the same as the outer packing material for vacuum insulation material explained in the section "A. Outer packing material for vacuum insulation material" above; thus, the explanation herein is omitted.

2. Core Material

The core material in the vacuum insulation material of the present disclosure is a member that is enclosed in the outer packing material. Incidentally, enclosed (enclosing) means sealed (sealing) inside the bag body formed of the outer packing materials.

The core material may be a material of which heat conductivity is low, and examples thereof may include a particulate, a foam resin, and a fiber. The core material may be formed of one material among the above described materials, and may be a composite material formed by mixing two or more of the materials. Also, the core material may be formed of an inorganic material or an organic material, and may be a mixture of the one formed of an organic material and the one formed of an inorganic material.

3. Others

In the vacuum insulation material of the present disclosure, the core material is enclosed inside a bag body of the outer packing material, and the inside sealed is decompressed to a vacuum state. The vacuum degree inside the vacuum insulation material of the present disclosure is, for example, preferably 5 Pa or less. The reason therefor is to lower the heat conduction due to the convection of air remained inside so as to achieve excellent thermal insulation performance.

The lower the heat conductivity of the vacuum insulation material of the present disclosure, the more preferable. The heat conductivity is, for example, preferably 5 mW/(mK) or less. The reason therefor is that the heat would not be easily conducted to outside, and thus high heat insulation effect can be achieved. Above all, the heat conductivity is more preferably 4 mW/(mK) or less, and further preferably 3 mW/(mK) or less. The heat conductivity may be a value measured in accordance with JIS A1412-2:1999 in the conditions of high temperature side at 30° C., low temperature side at 10° C., and average temperature at 20° C.

4. Production Method

As the method for producing the vacuum insulation material of the present disclosure, a known method may be used. For example, two pieces of the outer packing material for vacuum insulation material explained in the section "A. Outer packing material for vacuum insulation material" above are prepared and overlapped so that each thermally weldable film faces to each other, and three sides of the outer periphery are thermally welded (heat-sealed) to obtain a bag body of which one side opens. After inserting a core material to the bag body from the opening, the air is sucked from the opening and the opening is sealed when inside the bag body is in a decompressed state; thereby, the vacuum insulation material may be obtained.

C. Article Provided with Vacuum Insulation Material

The article provided with vacuum insulation material of the present disclosure is a member comprising an article including a thermal insulation region, and a vacuum insulation material; wherein the vacuum insulation material includes a core material, and an outer packing material enclosing the core material; and the outer packing material includes a thermally weldable film and a gas barrier film; the gas barrier film includes a base material and a metal aluminum film formed on one surface of the base material; and the metal aluminum film satisfies the below formula (1) and formula (2):

$$1.0*10^{-3} \leq (I_A/I_B)/T \leq 3.5*10^{-3} \quad (1)$$

$$(A/B)/T \geq 3.8*10^{-3} \quad (2).$$

In the formula (1) and the formula (2), $I_A$ represents a peak intensity (cps) of a diffraction peak positioned at $2\theta = 38.5° \pm 1.0°$ measured for the metal aluminum film in a X-ray diffraction measurement using a CuKα-ray; $I_B$ represents a peak intensity (cps) of a diffraction peak positioned at $2\theta = 44.6° \pm 1.0°$ measured for the metal aluminum foil in a X-ray diffraction measurement using a CuKα-ray; A represents a peak intensity (kcps) of an aluminum element in the metal aluminum film measured in a fluorescent X-ray analysis; B represents a peak intensity (kcps) of an aluminum element in a metal aluminum foil measured in a fluorescent X-ray analysis; and T represents a thickness (nm) of the metal aluminum film.

According to the article provided with vacuum insulation material of the present disclosure, the outer packing material constituting the vacuum insulation material provided in the article is the outer packing material for vacuum insulation material explained in the section "A. Outer packing material for vacuum insulation material" above, and thus the initial water vapor barrier properties are excellent, and degrade in water vapor barrier properties due to bend can be inhibited. Thereby, the vacuum insulation material can achieve high thermal insulation performance from the initial stage, and also, can maintain the thermal insulation performance for a long period of time even when used in a bent form. The article is provided with such a vacuum insulation material, and thus energy conservation of the article to be in the environment having a high temperature and a high humidity and of a target material wherein the article is used may be achieved.

Hereinafter, each constitution of the article provided with vacuum insulation material of the present disclosure is explained. Incidentally, the vacuum insulation material, and the outer packing material used in the vacuum insulation material for the article provided with vacuum insulation material of the present disclosure are explained in the sections "B. Vacuum insulation material" and "A. Outer packing material for vacuum insulation material" above; thus, the explanations herein are omitted.

The article provided with vacuum insulation material of the present disclosure includes a thermal insulation region. Here, the thermal insulation region is a region thermally insulated by the vacuum insulation material, which is, for example, a region warmed or cooled, a region surrounding a heating source and a cooling source, and a region isolated from the heating source and the cooling source. These regions may be space and may be substance. Examples of the article may include electronic devices such as a refrigerator, a freezer, a heat-keeping device, and a cool-keeping device, containers such as a heat-keeping container, a cool-keeping container, a container for transportation, a container, and a storing container, conveyance for transporting such as a vehicle, an airplane, and a vessel, buildings such as a house and a storehouse, and construction materials such as a wall material and a floor material.

Incidentally, the present disclosure is not limited to the embodiments. The embodiments are exemplification, and any other variations are intended to be included in the technical scope of the present disclosure if they have substantially the same constitution as the technical idea described in the claim of the present disclosure and offer similar operation and effect thereto.

EXAMPLES

The present disclosure is hereinafter explained in further details with reference to Examples and Comparative Examples below.

1. Evaluation of Gas Barrier Film Solely

Reference Example 1

As a base material, a PET film (Lumirror™ P60 from TORAY ADVANCED FILM CO., LTD.) was set to the unwinding device in a continuous vacuum vapor deposition device (TopMet from APPLIED MATERIALS, INC.), and the base material was let running at the running speed of 310 m/min to form a metal aluminum film on one surface by once vapor deposition, and thereby a gas barrier film A was obtained. The obtained gas barrier film A was winded. The metal aluminum film was formed in the vacuum vapor deposition device decompressed to less than $1.0*10^{-1}$ Pa by feeding an aluminum wire to the resistance heating part so as to melt, and the vaporized metal aluminum was adhered to and deposited on one surface of the PET film running. On this occasion, the power value (vapor deposition board power value) supplied to the resistance heating part was in the range of 7.8 kW to 8.0 kW. The thickness of the metal aluminum film in the obtained gas barrier film A was measured in the method below. The thickness was 74 nm.

Reference Example 2

As a base material, a PET film (Lumirror™P60 from TORAY ADVANCED FILM CO., LTD.) was set to the unwinding device in a continuous vacuum vapor deposition device (TopMet from APPLIED MATERIALS, INC.), and the base material was let running at the running speed of 440 m/min to adhere and deposit the metal aluminum vaporized on one surface (first vapor deposition), and thereby an intermediate film was formed and then winded. In the first vapor deposition, in the vacuum vapor deposition device decompressed to less than $1.0*10^{-1}$ Pa, an aluminum wire was fed to the resistance heating part so as to melt, and the vaporized metal aluminum was adhered to and deposited on one surface of the PET film running. On this occasion, the power value (vapor deposition board power value) supplied to the resistance heating part was in the range of 7.5 kW to 8.0 kW. The winded intermediate film was set to the unwinding device again, and was let running at the running speed of 440 m/min to further adhere and deposit the metal aluminum vaporized (second vapor deposition) on the surface of the intermediate film where the metal aluminum had been adhered. Throughout those two steps of vapor deposition, a gas barrier film B wherein the metal aluminum film was formed on one surface of the PET film was obtained. After that, the obtained gas barrier film B was winded. In the second vapor deposition, the metal aluminum was adhered and deposited in the same conditions as in the first vapor deposition except that the power value (vapor deposition board power value) supplied to the resistance heating part was in the range of 8.0 kW to 8.5 kW. The thickness of the metal aluminum film in the obtained gas barrier film B was measured in the method below. The thickness was 134 nm.

Reference Example 3

A gas barrier film C was obtained in the same manner as in Reference Example 1 except that the running speed of the PET film was changed to 425 m/min and the power value (vapor deposition board power value) supplied to the resistance heating part was in the range of 8.0 kW to 8.5 kW. The thickness of the metal aluminum film in the obtained gas barrier film C was measured in the method below. The thickness was 42 nm.

Reference Comparative Example 1

A commercially available gas barrier film (TAF1519 from TORAY ADVANCED FILM CO., LTD.) wherein a metal aluminum vapor deposition film was formed on one surface of a PET film was used as a gas barrier film D. The thickness of the metal aluminum film in the gas barrier film D was measured in the method below. The thickness was 70 nm.

Reference Comparative Example 2

A gas barrier film E was obtained in the same manner as in Reference Example 1 except that the running speed of the PET film was changed to 325 m/min and the power value (vapor deposition board power value) supplied to the resistance heating part was in the range of 9.0 kW to 9.5 kW. The thickness of the metal aluminum film in the obtained gas barrier film E was measured in the method below. The thickness was 76 nm.

Reference Comparative Example 3

A gas barrier film F was obtained in the same manner as in Reference Example 2 except that the running speed of the PET film was changed to 415 m/min and the power value (vapor deposition board power value) supplied to the resistance heating part was in the range of 8.0 kW to 8.5 kW in the first vapor deposition, and the running speed of the intermediate film was changed to 250 m/min and the power value (vapor deposition boardpower value) supplied to the resistance heating part was in the range of 9.0 kW to 9.5 kW in the second vapor deposition. The thickness of the metal aluminum film in the obtained gas barrier film F was measured in the method below. The thickness was 136 nm.

Reference Comparative Example 4

A gas barrier film G was obtained in the same manner as in Reference Example 1 except that the running speed of the PET film was changed to 300 m/min and the power value (vapor deposition board power value) supplied to the resistance heating part was in the range of 8.0 kW to 9.0 kW. The thickness of the metal aluminum film in the obtained gas barrier film G was measured in the method below. The thickness was 49 nm.

Reference Comparative Example 5

A gas barrier film H was obtained in the same manner as in Reference Example 1 except that the running speed of the PET film was changed to 230 m/min and the power value (vapor deposition board power value) supplied to the resistance heating part was in the range of 8.0 kW to 9.0 kW. The thickness of the metal aluminum film in the obtained gas barrier film H was measured in the method below. The thickness was 75 nm.

Conditions for forming each gas barrier film obtained in Reference Examples 1 to 3 and Reference Comparative Examples 2 to 5 and the thickness of the obtained metal aluminum film are shown in Table 1.

TABLE 1

| | Gas barrier film | Vapor deposition method | Vapor deposition times | Vacuum degree [unit: Pa] | | Running speed [unit: m/min] | | Vapor deposition board power value [unit: kW] | | Vapor deposition film thickness [unit: nm] |
|---|---|---|---|---|---|---|---|---|---|---|
| | | | | First vapor deposition | Second vapor deposition | First vapor deposition | Second vapor deposition | First vapor deposition | Second vapor deposition | |
| Reference Example 1 | A | Vacuum vapor deposition (Resistance heating) | Once | $<1.0 \times 10^{-1}$ | — | 310 | — | 7.8-8.0 | — | 74 |
| Reference Example 2 | B | | Twice | $<1.0 \times 10^{-1}$ | $<1.0 \times 10^{-1}$ | 440 | 440 | 7.5-8.0 | 8.0-8.5 | 134 |
| Reference Example 3 | C | | Once | $<1.0 \times 10^{-1}$ | — | 425 | — | 8.0-8.5 | — | 42 |
| Reference Comparative Example 2 | E | | Once | $<1.0 \times 10^{-1}$ | — | 325 | — | 9.0-9.5 | — | 76 |
| Reference Comparative Example 3 | F | | Twice | $<1.0 \times 10^{-1}$ | $<1.0 \times 10^{-1}$ | 415 | 250 | 8.0-8.5 | 9.0-9.5 | 136 |
| Reference Comparative Example 4 | G | | Once | $<1.0 \times 10^{-1}$ | — | 300 | — | 8.0-9.0 | — | 49 |
| Reference Comparative Example 5 | H | | Once | $<1.0 \times 10^{-1}$ | — | 230 | — | 8.0-9.0 | — | 75 |

<Evaluation 1. Measurement of Thickness T of Metal Aluminum Film>

A sample in a desired size was cut out from each gas barrier film obtained in Reference Examples 1 to 3 and Reference Comparative Examples 1 to 5, and the outer periphery of the cut-out sample was fixed by curing with a curing resin (cold mounting resin EpoFix from Struers). The fixed sample was cut with a diamond knife in thickness direction to expose the cross-section, the image of the exposed cross-section was obtained in approximately a hundred thousand magnification using a scanning electron microscope (SU-8000 from Hitachi High-Tech Corporation), and in the image, thicknesses at 3 points in about equal distance were measured. This operation was conducted to three samples per each gas barrier film, and the average of the measured values of total 9 pieces was regarded as the value of thickness T of the metal aluminum film in each gas barrier film.

<Evaluation 2. X-Ray Diffraction Measurement>

(1) Value $I_A$ of Metal Aluminum Film in Gas Barrier Film

Each gas barrier film obtained in Reference Examples 1 to 3 and Reference Comparative Examples 1 to 5 was respectively placed on the stage of an X-ray diffraction device, an X-ray diffraction (XRD) measurement was conducted in the below conditions using the metal aluminum film as the measurement surface, and the height of the diffraction peak positioned around 2 θ=38.5° in the diffraction spectrum was obtained. Incidentally, in order to exclude the influence of amorphous halo peak, a wave form with the half value width of 6° or less in the obtained diffraction spectrum was defined as the diffraction peak. The measurement was conducted at 3 points of each gas barrier film and the average value of the heights of obtained diffraction peaks was regarded as the value $I_A$ of the metal aluminum film in that gas barrier film.

<Conditions for XRD Measurement>

X-ray diffraction device: SmartLab from Rigaku Corporation

Light source: CuKα-ray (wavelength: 1.5418 A)
Scanning axis: 2 θ/θ
Tube voltage: 45 kV
Tube current: 200 mA
Optical system: parallel beam optical system
Slit structure: Incident side slit (solar slit 5.0°, incident slit 5 mm), light reception side slit (parallel slit analyzer (PSA) 0.5°)
Detector: SC-70
Measurement range: 2 θ=3° to 80°
Scanning speed: 6.0°/min.
Scanning step: 0.01°

(2) Value $I_B$ of Metal Aluminum Foil

An X-ray diffraction measurement was conducted to a metal aluminum foil (BESPA from UACJ) having a thickness of 6.0 μm, using a mirror surface as the measurement surface, in the same conditions as those for the measurement of the value $I_A$, and the height of the diffraction peak positioned around 2 θ=44.6° in the obtained diffraction spectrum was obtained. Incidentally, in order to exclude the influence of amorphous halo peak, a wave form with the half value width of 6° or less in the obtained diffraction spectrum was defined as the diffraction peak. The measurement was conducted at 3 points in the metal aluminum foil, and the average value of the heights of obtained diffraction peaks was regarded as the value $I_B$ of that metal aluminum foil.

(3) Value of $(I_A/I_B)$ T in Formula (1)

The value of $(I_A/I_B)/T$ was calculated from the value $I_A$ of the metal aluminum film in each gas barrier film, the value $I_B$ of the metal aluminum foil, and the value of the thickness T of the metal aluminum film obtained in Evaluation 1 above.

<Evaluation 3. Fluorescent X-Ray Analysis>

(1) Value A of Metal Aluminum Film in Gas Barrier Film

Regarding each gas barrier film obtained in Reference Examples 1 to 3 and Reference Comparative Examples 1 to 5, a fluorescent X-ray analysis (XRF) was conducted for the metal aluminum film as the measurement surface, and in the obtained AlKα-ray, the height of the peak was obtained by connecting the range of 140° to 148° from the base line in a straight line. The measurement was conducted at 3 points in each gas barrier film and the average value of the heights of the obtained peaks of AlKα-ray was regarded as the value A of the metal aluminum film in that gas barrier film.

<Conditions for XRF>

X-ray source: Rh bulb·4.0 kW
Measurement vacuum degree: 13 Pa
Excitation conditions:
Tube voltage 50 kV, tube current 80 mA
Measurement diameter (X-ray irradiation range): 30 mm (1)
Measurement 2 θ angle: 140° to 148°
Measurement element: Al (metal aluminum)

(2) Value B of Metal Aluminum Foil

A fluorescent X-ray analysis was conducted for a metal aluminum foil (BESPA from UACJ) having a thickness of 6.0 μm using the mirror surface as the measurement surface, in the same conditions as those for the measurement of the value A, and in the obtained AlKα-ray, the height of the peak was obtained by connecting the range of 140° to 148° from the base line in a straight line. The measurement was conducted at 3 points in each metal aluminum foil and the average value of the heights of the obtained peaks of AlKα-ray was regarded as the value B of that metal aluminum foil.

(3) (A/B)/T in Formula (2)

The value of (A/B)/T was calculated from the value A of the metal aluminum film in each gas barrier film, the value B of the metal aluminum foil, and the value of the thickness T of the metal aluminum film obtained in Evaluation 1 above.

<Evaluation 4. Initial Water Vapor Permeability>

Regarding each gas barrier film obtained in Reference Examples 1 to 3 and Reference Comparative Examples 1 to 5, the initial water vapor permeability was measured. The water vapor permeability was measured in accordance with JIS K7129:2008 (Annex B: infrared ray sensor method) using "PERMATRAN" from U.S. MOCON with the following steps. First, the metal aluminum film side surface of each gas barrier film obtained in Reference Examples 1 to 3 and Reference Comparative Examples 1 to 5 was respectively laminated to a PET film (EMBLET™-PTMB from UNITIKA LTD.) having a thickness of 12 μm using an adhesive agent (main agent: RU-77T and curing agent: H-7 from ROCK PAINT Co., Ltd.) to produce a sample. A test piece in a desired size was cut out from the sample, and the test piece is installed between an upper room and a lower room of the water vapor permeability measurement device so that the metal aluminum film side surface of the gas barrier film came to a high humidity side (water vapor supplying side), and the measurement was conducted to an area for permeability set as approximately 50 cm² (region for permeability: circle having a diameter of 8 cm) in conditions of a temperature of 40° C. and relative humidity difference of 90% RH. The measurement was conducted to three of the test piece per one gas barrier film, and the average of those measured values was regarded as the water vapor permeability of that gas barrier film.

<Evaluation 5. Initial Pseudo Water Vapor Permeability Coefficient>

Regarding each gas barrier film obtained in Reference Examples 1 to 3 and Reference Comparative Examples 1 to 5, the product of the average value of the measured values of the water vapor permeability obtained in Evaluation 4 above and the value of the thickness T of the metal aluminum film obtained in Evaluation 1 above was regarded as the value of the initial pseudo water vapor permeability coefficient of that gas barrier film.

<Evaluation 6. Water Vapor Permeability After Bending Treatment at Normal Temperature>

A rectangular individual piece in a size of 210 mm width by 297 mm length (A4 size) was collected from each gas barrier film obtained in Reference Examples 1 to 3 and Reference Comparative Examples 1 to 5, and a bending treatment was conducted to each of the individual piece in accordance with ASTM F392 using a Gelvo type Flex-Cracking Tester (BE1006 from TESTER SANGYO CO., LTD.). In the bending treatment, the both narrow sides of the individual piece were set to the grips of the Gelvo type Flex-Cracking Tester, the individual piece was twisted so that the maximum twist angle became 440° and shrunk in 3.5 inches, then the individual piece was further shrunk in 2.5 inches by not twisting, and thereafter the individual piece was returned to the initial state with reversed steps. These steps were counted as one cycle, and three cycles were conducted to each individual piece. Regarding each individual piece after the bending treatment, the water vapor permeability was measured with the method and conditions explained in the section of Evaluation 4 above.

Results from Evaluation 1 to Evaluation 6 are shown in Table 2.

in the specified range had excellent initial water vapor barrier properties, and was capable of inhibiting degrade in water vapor barrier properties due to bend.

2. Evaluation of Outer Packing Material for Vacuum Insulation Material

Example 1

Three of the gas barrier film A obtained in Reference Example 1, and a straight chain (linear) low-density polyethylene (LLDPE) film having a thickness of 50 μm as a thermally weldable film were used, and an outer packing material for vacuum insulation material having the layering order of: first gas barrier film A//second gas barrier film A//third gas barrier film A//LLDPE film, was obtained. Incidentally, "//" in the layering order signifies the layer interface interposing an interlayer adhesive layer. In addition, regarding the first to the third gas barrier films, the first gas barrier film A was arranged so that the metal aluminum film surface faced to the second gas barrier film side, the second gas barrier film A was arranged so that the metal aluminum film surface faced to the third gas barrier film side, and the third gas barrier film A was arranged so that the metal aluminum film surface faced to the second gas barrier film side. The first to the third gas barrier films A and the LLDPE film were layered respectively interposing the interlayer adhesive layer using a dry lamination method. As the interlayer adhesive layer, an interlayer adhesive layer produced in the below blending ratio was pasted so that the pasting amount becomes 3.5 g/m² on the surface of one film among two adjacent films interposing the interlayer adhesive layer in the layering order.

<Production of Interlayer Adhesive Agent>

A main agent mainly composed of polyester, a curing agent including aliphatic polyisocyanate, and ethyl acetate

TABLE 2

| | Gas barrier film | Evaluation 1 nm | Evaluation 2 $(I_4/I_B)/T$ | Evaluation 3 (A/B)/T | Evaluation 4 g/(m² · day) | Evaluation 5 (g · nm)/(m² · day) | Evaluation 6 g/(m² · day) |
|---|---|---|---|---|---|---|---|
| Reference Example 1 | A | 74 | 1.43E−03 | 4.04E−03 | 0.11 | 8.1 | 0.25 |
| Reference Example 2 | B | 134 | 2.45E−03 | 4.93E−03 | 0.09 | 12.1 | 0.25 |
| Reference Example 3 | C | 42 | 2.13E−03 | 5.42E−03 | 0.19 | 8.0 | 0.33 |
| Reference Comparative Example 1 | D | 70 | 4.81E−03 | 4.45E−03 | 0.21 | 14.7 | 1.12 |
| Reference Comparative Example 2 | E | 76 | 4.81E−04 | 4.28E−03 | 0.53 | 40.3 | 0.56 |
| Reference Comparative Example 3 | F | 136 | 9.09E−04 | 5.03E−03 | 0.25 | 34.0 | 0.59 |
| Reference Comparative Example 4 | G | 49 | 9.80E−04 | 3.55E−03 | 0.49 | 24.0 | 1.55 |
| Reference Comparative Example 5 | H | 75 | 1.39E−03 | 3.79E−03 | 0.24 | 18.0 | 1.22 |

From the results in Table 2, all of the initial water vapor permeability (Evaluation 4), the initial pseudo water vapor permeability coefficient (Evaluation 5), and the water vapor permeability after the bending test (Evaluation 6) of the gas barrier films in Reference Examples 1 to 3 were lower compared to the gas barrier films in Reference Comparative Examples 1 to 5. Accordingly, it was suggested that the gas barrier film of which $(I_4/I_B)/T$ and (A/B)/T were respectively were mixed so as the weight blending ratio became the main agent:the curing agent:the ethyl acetate=10:1:10, and thereby a 2-liquid curing type interlayer adhesive agent was produced.

Example 2

An outer packing material for vacuum insulation material was obtained in the same manner as in Example 1 except that each of the first to the third gas barrier film A was changed to the gas barrier film B obtained in Reference Example 2.

Example 3

An outer packing material for vacuum insulation material was obtained in the same manner as in Example 1 except that each of the first to the third gas barrier film A was changed to the gas barrier film C obtained in Reference Example 3.

Comparative Example 1

An outer packing material for vacuum insulation material was obtained in the same manner as in Example 1 except that each of the first to the third gas barrier film A was changed to the gas barrier film D obtained in Reference Comparative Example 1.

Comparative Example 2

An outer packing material for vacuum insulation material was obtained in the same manner as in Example 1 except that each of the first to the third gas barrier film A was changed to the gas barrier film E obtained in Reference Comparative Example 2.

Comparative Example 3

An outer packing material for vacuum insulation material was obtained in the same manner as in Example 1 except that each of the first to the third gas barrier film A was changed to the gas barrier film F obtained in Reference Comparative Example 3.

<Evaluation 7. Initial Water Vapor Permeability>

Regarding the outer packing materials for vacuum insulation material obtained in Examples 1 to 3 and Comparative Examples 1 to 3, the initial water vapor permeability was respectively measured. The measurement was conducted using a water vapor permeability measurement device ("DELTAPERM" from U.K. Technolox Ltd.) in the conditions of at a temperature of 40° C. and relative humidity difference of 90% RH in accordance with ISO 15106-5:2015 (differential pressure method). A sample was cut out in a desired size from each outer packing material for vacuum insulation material, and the sample was installed between an upper room and a lower room of the device so as the outermost surface, which is opposite side to the thermally weldable film in the thickness direction (layering direction) among the outermost surfaces opposing to each other, came to high humidity side (water vapor supplying side), and the measurement was conducted to the permeation area of approximately 50 cm² (permeation region: circle having the diameter of 8 cm) in the conditions of at a temperature of 40° C. and relative humidity difference of 90% RH. The measurement was conducted to three of the sample per one outer packing material for vacuum insulation material, and the average of those measured values was regarded as the water vapor permeability of that outer packing material for vacuum insulation material.

<Evaluation 8. Water Vapor Permeability After Bending Treatment At Normal Temperature>

Regarding the outer packing materials for vacuum insulation material obtained in Examples 1 to 3 and Comparative Examples 1 to 3, a test piece was respectively cut out in the same manner as in Evaluation 6 above, and the bending treatment in the same conditions as in Evaluation 6 above was conducted. The bending treatment was conducted three cycles per each test piece. Regarding each test piece after the bending treatment, the water vapor permeability was measured with the same method and conditions explained in Evaluation 7 above.

Results of Evaluation 7 and Evaluation 8 are shown in Table 3.

TABLE 3

| | Gas barrier film | Evaluation 7 g/(m² · day) | Evaluation 8 g/(m² · day) |
|---|---|---|---|
| Example 1 | A | 5.5E−03 | 0.05 |
| Example 2 | B | 3.6E−03 | 0.05 |
| Example 3 | C | 8.0E−03 | 0.12 |
| Comparative Example 1 | D | 7.7E−02 | 0.51 |
| Comparative Example 2 | E | 3.9E−02 | 0.22 |
| Comparative Example 3 | F | 2.6E−02 | 0.32 |

From the result in Table 3, the outer packing materials for vacuum insulation material obtained in Examples 1 to 3 included the gas barrier films of Reference Examples 1 to 3 in the constitution, and thus both of the initial water vapor permeability (Evaluation 7) and the water vapor permeability after the bending test (Evaluation 8) thereof were lower compare to the outer packing materials for vacuum insulation material obtained in Comparative Examples 1 to 3. Accordingly, it was suggested that the outer packing material for vacuum insulation material including the gas barrier film of which $(I_A/I_B)$ T and (A/B)/T were respectively in the specified range had excellent initial water vapor barrier properties, and was capable of inhibiting degrade in water vapor barrier properties due to bend.

REFERENCE SIGNS LIST

1 . . . base material
2 . . . metal aluminum film
10 . . . outer packing material for vacuum insulation material
12 . . . gas barrier film
11 . . . thermally weldable film
b 21 . . . core material
20 . . . vacuum insulation material

The invention claimed is:

1. An outer packing material for vacuum insulation material comprising a thermally weldable film and a gas barrier film; wherein
the gas barrier film includes a base material and a metal aluminum film formed on one surface of the base material; and
the metal aluminum film satisfies the below formula (1) and formula (2):

$$1.0*10^{-3} \leq (I_A/I_B)/T \leq 3.5*10^{-3} \quad (1)$$

$$(A/B)/T \geq 3.8*10^{-3} \quad (2)$$

wherein $I_A$ represents a peak intensity (cps) of a diffraction peak positioned at 2θ=38.5°±1.0° measured for the metal aluminum film in a X-ray diffraction measurement using a CuKα-ray;
$I_B$ represents a peak intensity (cps) of a diffraction peak positioned at 2θ=44.6°±1.0° measured for a metal aluminum foil having alloy number of A8021 and thickness of 6 μm or more in a X-ray diffraction measurement using a CuKα-ray;

A represents a peak intensity (kcps) of an aluminum element in the metal aluminum film measured in a fluorescent X-ray analysis;

B represents a peak intensity (kcps) of an aluminum element in a metal aluminum foil having alloy number of A8021 and thickness of 6 μm or more measured in a fluorescent X-ray analysis; and T represents a thickness (nm) of the metal aluminum film.

2. A vacuum insulation material comprising a core material, and an outer packing material enclosing the core material; wherein the outer packing material includes a thermally weldable film and a gas barrier film;

the gas barrier film includes a base material and a metal aluminum film formed on one surface of the base material; and the metal aluminum film satisfies the below formula (1) and formula (2):

$$1.0*10^{-3} \leq (I_A/I_B)/T \leq 3.5*10^{-3} \quad (1)$$

$$(A/B)/T \geq 3.8*10^{-3} \quad (2)$$

wherein $I_A$ represents a peak intensity (cps) of a diffraction peak positioned at $2\theta=38.5°\pm1.0°$ measured for the metal aluminum film in a X-ray diffraction measurement using a CuKα-ray;

$I_B$ represents a peak intensity (cps) of a diffraction peak positioned at $2\theta=44.6°\pm1.0°$ measured for a metal aluminum foil having alloy number of A8021 and thickness of 6 μm or more in a X-ray diffraction measurement using a CuKα-ray;

A represents a peak intensity (kcps) of an aluminum element in the metal aluminum film measured in a fluorescent X-ray analysis;

B represents a peak intensity (kcps) of an aluminum element in a metal aluminum foil having alloy number of A8021 and thickness of 6 μm or more measured in a fluorescent X-ray analysis; and T represents a thickness (nm) of the metal aluminum film.

3. An article provided with vacuum insulation material comprising an article including a thermal insulation region, and a vacuum insulation material; wherein the vacuum insulation material includes a core material, and an outer packing material enclosing the core material; and the outer packing material includes a thermally weldable film and a gas barrier film;

the gas barrier film includes a base material and a metal aluminum film formed on one surface of the base material; and the metal aluminum film satisfies the below formula (1) and formula (2):

$$1.0*10^{-3} \leq (I_A/I_B)/T \leq 3.5*10^{-3} \quad (1)$$

$$(A/B)/T \geq 3.8*10^{-3} \quad (2)$$

wherein $I_A$ represents a peak intensity (cps) of a diffraction peak positioned at $2\theta=38.5°\pm1.0°$ measured for the metal aluminum film in a X-ray diffraction measurement using a CuKα-ray;

$I_B$ represents a peak intensity (cps) of a diffraction peak positioned at $2\theta=44.6°\pm1.0°$ measured for a metal aluminum foil having alloy number of A8021 and thickness of 6 μm or more in a X-ray diffraction measurement using a CuKα-ray;

A represents a peak intensity (kcps) of an aluminum element in the metal aluminum film measured in a fluorescent X-ray analysis;

B represents a peak intensity (kcps) of an aluminum element in a metal aluminum foil having alloy number of A8021 and thickness of 6 μm or more measured in a fluorescent X-ray analysis; and T represents a thickness (nm) of the metal aluminum film.

* * * * *